(12) United States Patent
Aoi et al.

(10) Patent No.: US 8,578,677 B2
(45) Date of Patent: Nov. 12, 2013

(54) END CAP AND MOLDING

(75) Inventors: Hirohito Aoi, Fujisawa (JP); Tetsuya Yano, Kariya (JP)

(73) Assignees: Shiroki Corporation, Fujisawa-Shi, Kanagawa (JP); Toyota Shatai Kabushiki Kaisha, Kariya-Shi, Aichi (JP)

(*) Notice: Subject to any disclaimer, the term of this patent is extended or adjusted under 35 U.S.C. 154(b) by 0 days.

(21) Appl. No.: 13/634,865

(22) PCT Filed: Feb. 3, 2011

(86) PCT No.: PCT/JP2011/000597
§ 371 (c)(1),
(2), (4) Date: Sep. 13, 2012

(87) PCT Pub. No.: WO2011/121874
PCT Pub. Date: Oct. 6, 2011

(65) Prior Publication Data
US 2013/0008123 A1 Jan. 10, 2013

(30) Foreign Application Priority Data
Mar. 30, 2010 (JP) ................. 2010-076716

(51) Int. Cl.
*E04B 1/38* (2006.01)
(52) U.S. Cl.
USPC ........................................ 52/716.7

(58) Field of Classification Search
USPC ........ 52/716.7, 272, 281, 282.1, 282.3, 282.4
See application file for complete search history.

(56) References Cited

FOREIGN PATENT DOCUMENTS

| JP | 2001-063365 A | 3/2001 |
| JP | 2004-249745 A | 9/2004 |
| JP | 2006-069229 A | 3/2006 |
| JP | 4292932 B2 | 7/2009 |

OTHER PUBLICATIONS

International Search Report in PCT/JP2011/000597 dated Apr. 19, 2011.

*Primary Examiner* — Mark Wendell
(74) *Attorney, Agent, or Firm* — McGinn IP Law Group, PLLC

(57) ABSTRACT

An end cap is attached to a molding main body and is attached to a vehicle body by pressing a clip via the molding main body to the vehicle body. The end cap includes a cap portion which covers an end portion of the molding main body when the end cap is attached to the molding main body, an insertion portion whose proximal end portion is continuous with the cap portion and which is inserted into the molding main body, and a rib which is provided on the insertion portion such that the rib projects from an opening of the molding main body and which receives a reaction force from the vehicle body when a forward end portion of the rib butts against the vehicle body due to a pressing force which is applied to the clip via the molding main body so as to lock the clip.

3 Claims, 4 Drawing Sheets

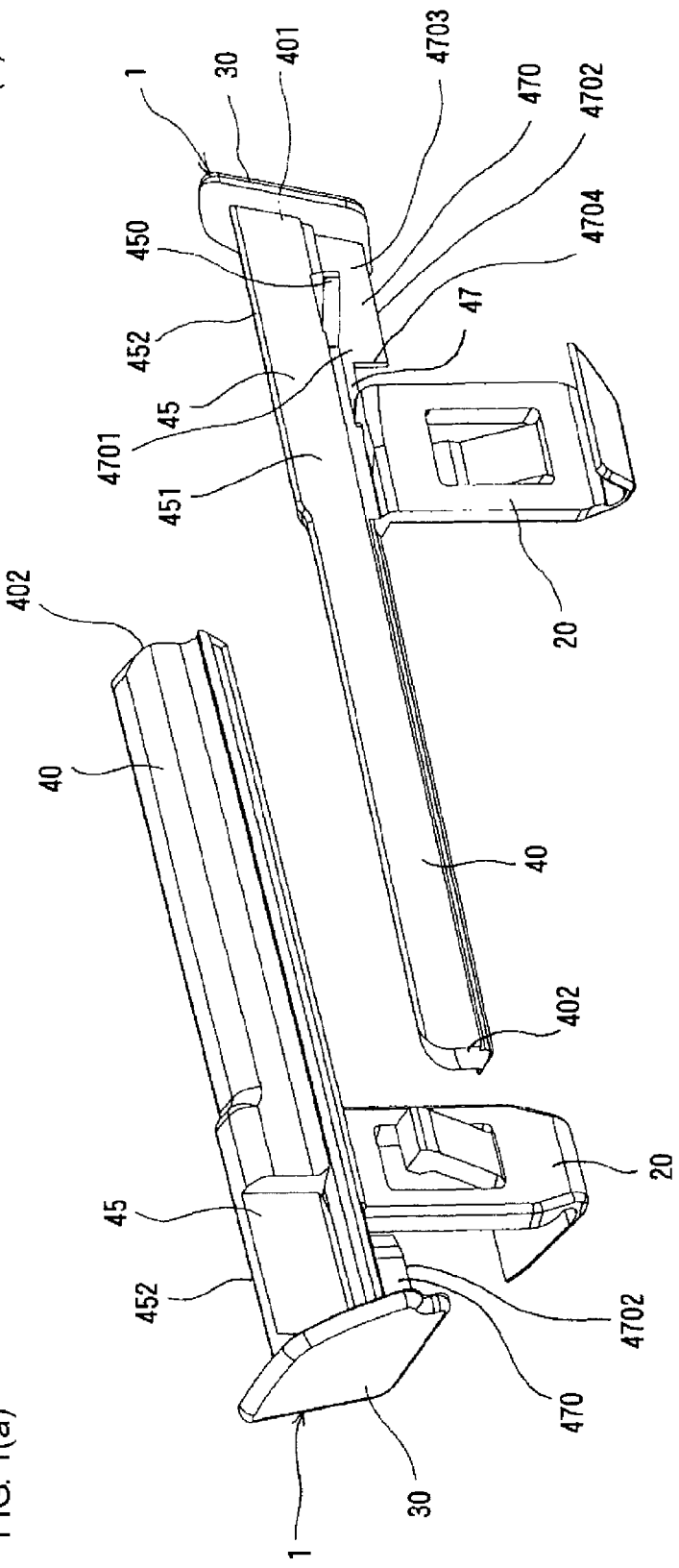

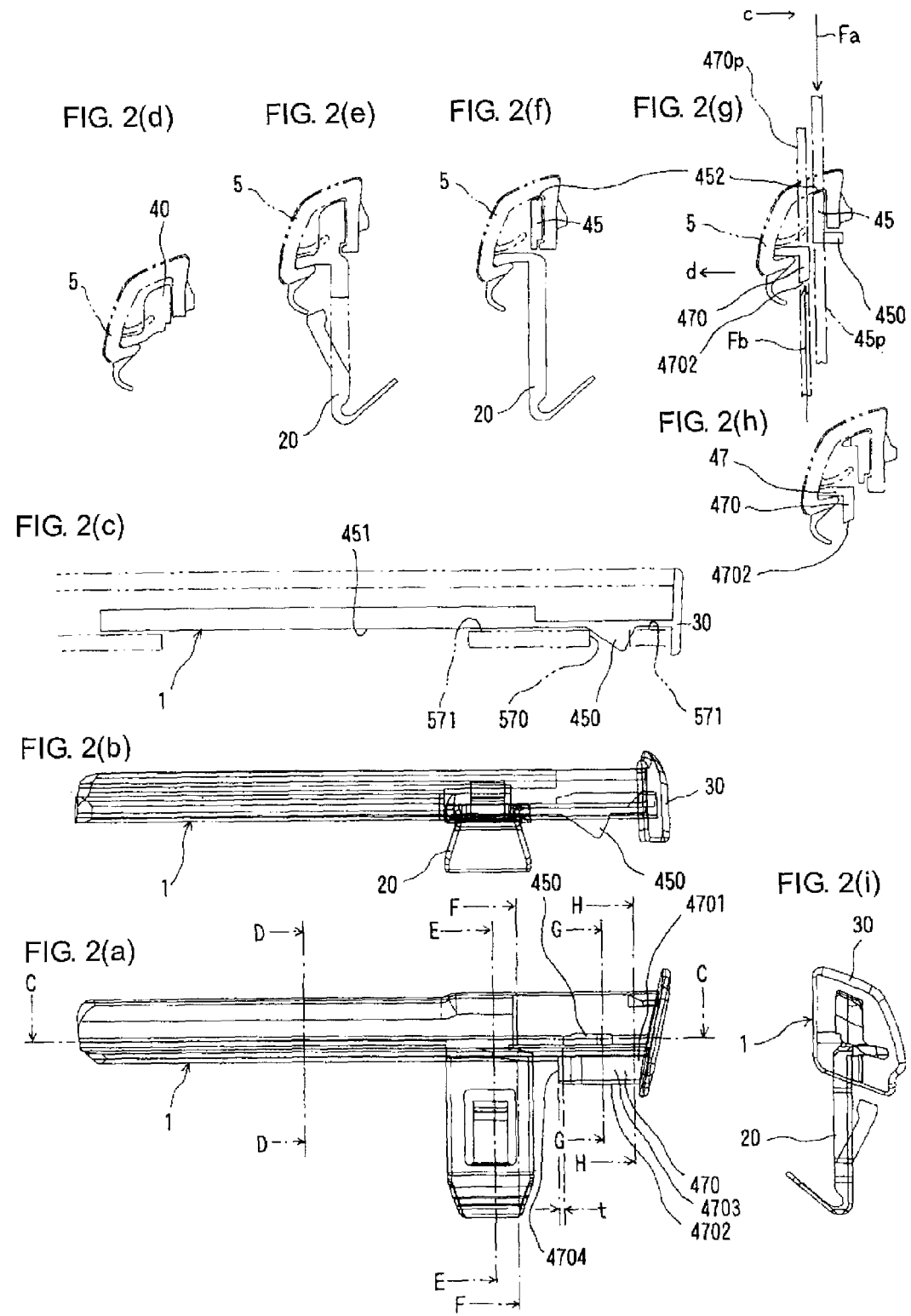

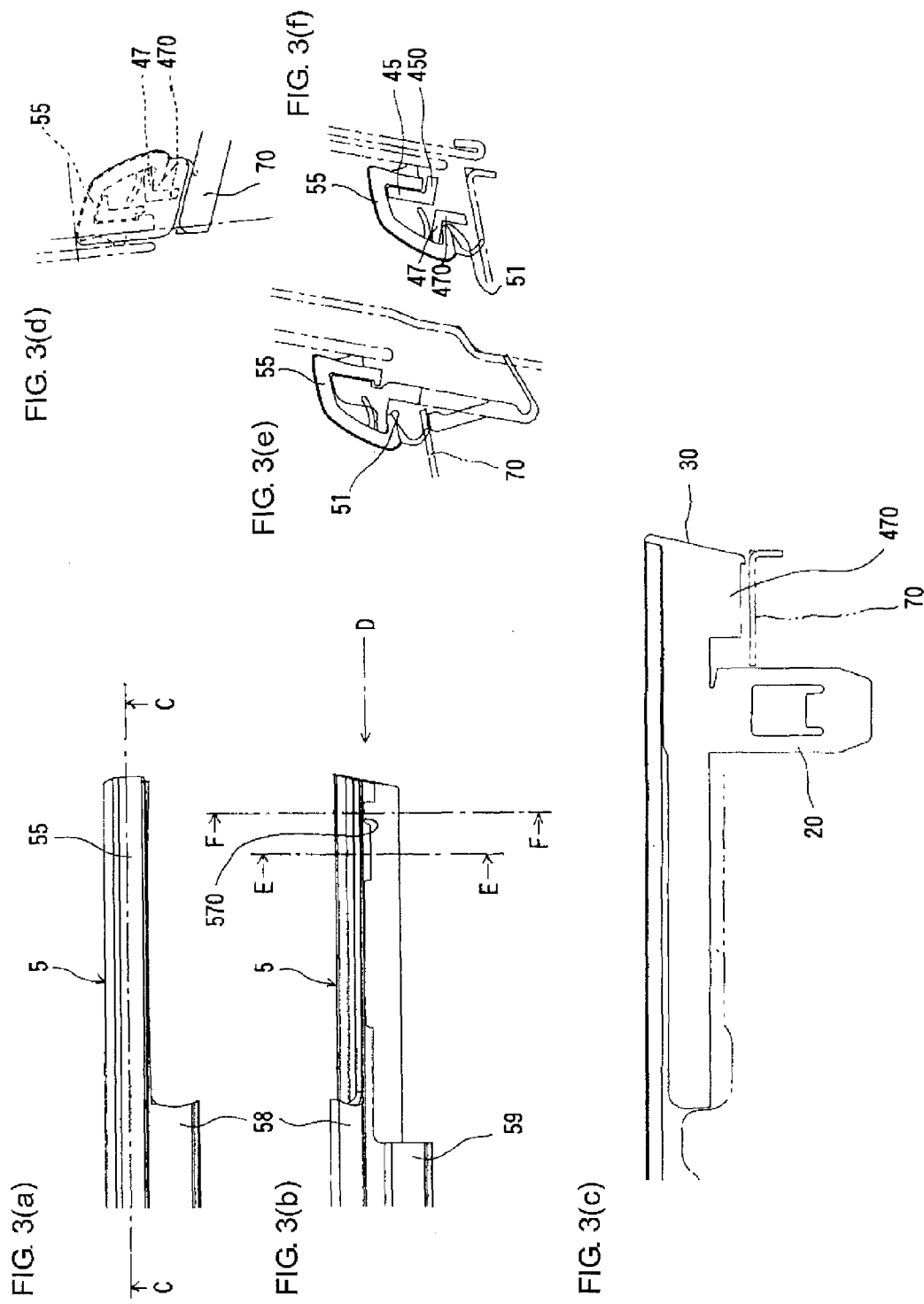

END CAP AND MOLDING

TECHNICAL FIELD

The present invention relates to an end cap which is to be attached to an end portion of a molding main body. Specifically, the present invention relates to an end cap which is attached to a vehicle body together with a molding main body through an operation of pressing a clip, which projects from an opening of the molding main body, from the outer surface of the molding main body at a position immediately above the clip.

Also, the present invention relates to a molding which includes a molding main body and an end cap attached thereto.

BACKGROUND ART

Japanese patent No. 4292932 (Patent Document 1) discloses an example of the structure of an end cap which is attached to an end portion of a molding main body having an opening in its cross section. A clip of the end cap, which projects downward from the opening of the molding main body, is locked to an outer panel through an operation of pressing the clip from the outer surface of the molding main body via the molding main body. Thus, a molding (the molding main body+the end cap) is attached to the outer panel. The expression "having an opening in its cross section" means that the cross section has the shape of an annulus which is partially cut so as to form an opening. For example, "having an opening in its cross section" means that the shape of the cross section can be represented by a character such as C, U, J, V, or a squarish C.

PRIOR ART DOCUMENT

Patent Document

Patent Document 1: Japanese Patent No. 4292932

SUMMARY OF THE INVENTION

Problems to be Solved by the Invention

In the structure of Document 1 in which a clip which is provided on an end cap and projects from the opening of a molding main body is locked to an outer panel, when a portion of the molding main body immediately above the clip (=an outer surface of a wall portion of the molding main body located opposite the opening) is pressed toward the clip, the pressed portion and a portion therearound are apt to slightly deform in the pressing direction. In the case where the molding main body, the end cap, the outer panel, etc. are manufactured with very high accuracy so that they have designed dimensions, as shown in FIG. 3(c), a lower end (end portion located on the side toward the outer panel 70) of the cap body 30 of the end cap butts against the outer panel 70 and supports the end cap. Therefore, the above-mentioned slight deformation is prevented.

Meanwhile, in the case where any of the above-mentioned components have dimensions slightly deviated from the designed dimensions, the lower end of the cap body 30 may be located outward of the right end of the outer panel 70, unlike the case shown in FIG. 3(c).

In such a case, the above-mentioned slight deformation cannot be prevented, and a portion of the upper edge of the outer panel 70 (a portion of the upper edge located near the end of a door) which corresponds to the slightly deformed portion fits into a space between the inner side of a lower end portion of the cap body 30 of the end cap and an edge portion of the clip 20, which fixes the above-mentioned slight deformation. Therefore, the conventional end cap has a problem in that deterioration of appearance is likely to occur at the end of the molding.

An object of the present invention is to prevent the above-described deterioration of appearance.

Means for Solving the Problems

The configuration of the present invention will be described in the following paragraphs [1] to [4]. Notably, in the present section ("Means for Solving the Problems") and the next section ("EFFECTS OF THE INVENTION), reference numerals are added so as to facilitate understanding. However, the present invention is not limited to the configurations denoted by reference numerals.

[1] Configuration 1

An end cap 1 which is attached to an end portion of a molding main body 5 having an opening 51 in its cross section and which is attached to a vehicle body 70 together with the molding main body 5 through an operation of pressing a clip 20, which projects from the opening 51 of the molding main body 5, via the molding main body 5 to thereby lock the clip 20 to the vehicle body 70, the end cap 1 being characterized by comprising:

a cap portion 30 which covers the end portion of the molding main body 5 when the end cap 1 is attached to the molding main body 5;

an insertion portion 40 whose proximal end portion 401 is continuous with an inner surface of the cap portion 30 and which is inserted into the molding main body 5 such that a forward end portion 402 of the insertion portion 40 is first inserted into the molding main body 5; and a rib 470 which is provided on the insertion portion 40 such that the rib 470 projects from the opening 51 of the molding main body 5 and which receives a reaction force from the vehicle body 70 when a forward end portion 4702 of the rib 470 butts against the vehicle body 70 due to a pressing force which is applied to the clip 20 via the molding main body 5 so as to lock the clip 20.

[2] Configuration 2

In Configuration 1, the insertion portion 40 includes a vertical plate portion 45 having an insertion sliding-contact surface 451 which comes into sliding contact with a guide surface 571 of the molding main body 5 when the insertion portion 40 is inserted into the molding main body 5, and a horizontal plate portion 47 with which a proximal end portion 4701 of the rib 470 is continuous, wherein the vertical plate portion 45 is provided such that its one edge portion 452 butts against an inner surface of a wall portion 55 of the molding main body 5 located on the side opposite the opening so as to receive the pressing force which is applied to the end cap 1 via the molding main body 5 so as to lock the clip 20, and the rib 470 is located on the outboard side of an imaginary plane 45p containing the vertical plate portion 45.

[3] Configuration 3

In Configuration 1 or 2, the insertion portion 40 includes a locking portion 450 which projects from the insertion sliding-contact surface 451, which comes into sliding contact with the guide surface 571 of the molding main body 5 when the insertion portion 40 is inserted into the molding main body 5, the locking portion 450 being fitted into and locked to a cutout 570 provided on the guide surface 571 by a resilient force of the insertion portion 40, wherein the rib 470 is a plate-shaped rib having a plate surface 4703 extending in the insertion direction, and a forward end portion 4704 of the plate-shaped rib 470 with respect to the insertion direction is located forward of the locking portion 450 with respect to the insertion direction.

[4] Configuration 4

A molding which includes an end cap 1 according to any of Configurations 1 to 3 and a molding main body 5 to which the end cap 1 is attached.

Effects of the Invention

Configuration 1 is an end cap 1 which is attached to an end portion of a molding main body 5 having an opening 51 in its cross section and which is attached to a vehicle body 70 together with the molding main body 5 through an operation of pressing a clip 20, which projects from the opening 51 of the molding main body 5, via the molding main body 5 to thereby lock the clip 20 to the vehicle body 70. The end cap 1 includes a cap portion 30 which covers the end portion of the molding main body 5 when the end cap 1 is attached to the molding main body 5; an insertion portion 40 whose proximal end portion 401 is continuous with an inner surface of the cap portion 30 and which is inserted into the molding main body 5 such that a forward end portion 402 of the insertion portion 40 is first inserted into the molding main body 5; and a rib 470 which is provided on the insertion portion 40 such that the rib 470 projects from the opening 51 of the molding main body 5 and which receives a reaction force from the vehicle body 70 when a forward end portion 4702 of the rib 470 butts against the vehicle body 70 due to a pressing force which is applied to the end cap 1 via the molding main body 5 so as to lock the clip 20. In the case where the cap portion 30 is located outward of the edge of the vehicle body 70 due to, for example, dimensional errors of relevant members, when the clip 20 is pressed via the molding main body 5 in order to lock the clip 20 to the vehicle body 70, due to the pressing force, the forward end portion 4702 of the rib 470 butts against the vehicle body 70. Thus, the rib 470 receives a reaction force from the vehicle body 70 and supports the pressed portion and a portion around the pressed portion. Therefore, slight deformation (=sinking) of that portion in the pressing direction is prevented, and deterioration of appearance can be prevented.

Configuration 2 is an end cap 1 according to Configuration 1, wherein the insertion portion 40 includes a vertical plate portion 45 having an insertion sliding-contact surface 451 which comes into sliding contact with a guide surface 571 of the molding main body 5 when the insertion portion 40 is inserted into the molding main body 5, and a horizontal plate portion 47 with which a proximal end portion 4701 of the rib 470 is continuous, wherein the vertical plate portion 45 is provided such that its one edge portion 452 butts against an inner surface of a wall portion 55 of the molding main body 5 located on the side opposite the opening so as to receive the pressing force which is applied to the end cap 1 via the molding main body 5 so as to lock the clip 20, and the rib 470 is located on the outboard side of an imaginary plane 45p containing the vertical plate portion 45. Therefore, in addition to the above-described advantageous effect provided by Configuration 1, Configuration 2 provides an advantageous effect of preventing the pressing force for attachment of the molding from adversely affecting the sealing performance thereof. Namely, as a result of the end cap being configured as described above, the pressing force Fa applied for locking the clip and the reaction Fb applied from the vehicle body 70 to the rib 470 produce a rotational force which urges a portion of the molding near the upper edge thereof in a direction c toward the vehicle body, and urges a portion of the molding near the rib 470 in a direction d away from the vehicle body. Therefore, Configuration 2 provides an advantageous effect of preventing impairment of the sealing performance.

Configuration 3 is an end cap 1 according to Configuration 1 or 2, wherein the insertion portion 40 includes a locking portion 450 which projects from the insertion sliding-contact surface 451, which comes into sliding contact with the guide surface 571 of the molding main body 5 when the insertion portion 40 is inserted into the molding main body 5, the locking portion 450 being fitted into and locked to a cutout 570 provided on the guide surface 571 by a resilient force of the insertion portion 40, wherein the rib 470 is a plate-shaped rib having a plate surface 4703 extending in the insertion direction, and a forward end portion 4704 of the plate-shaped rib 470 with respect to the insertion direction is located forward of the locking portion 450 with respect to the insertion direction. Therefore, in addition to the above-described advantageous effect provided by Configuration 1 (or Configurations 1 and 2), Configuration 3 provides an advantageous effect of reliably preventing the rib 470 from hindering insertion of the insertion portion 40 into the molding main body 5. Namely, the insertion portion 40 (45) is pressed by the sliding-contact guide surface 571 of the molding main body 5 and deforms before the locking portion 450 is fitted into the cutout 570. Since the forward end portion 4704 of the rib 470 with respect to the insertion direction is inserted into the molding main body 5 before the insertion portion 40 (45) deforms, it is possible to reliably prevent the rib 470 from hindering the insertion of the insertion portion 40.

Configuration 4 is a molding which includes an end cap 1 according to any of Configurations 1 to 3 and a molding main body 5 to which the end cap 1 is attached. Therefore, it is possible to provide a molding which yields the advantageous effects of Configurations 1 to 3.

BRIEF DESCRIPTION OF THE DRAWINGS

FIGS. 1(*a*) and 1(*b*) are perspective views showing an end cap of an embodiment, wherein FIG. 1(*a*) is a perspective view as viewed from the front side (the outboard side (the outside of a vehicle) in a state in which the end cap is attached to a vehicle body; this applies to the following description), and FIG. 1(*b*) is perspective view as viewed from the back side (the inboard side (the inside of the vehicle) in a state in which the end cap is attached to the vehicle body; this applies to the following description).

FIGS. 2(*a*) to 2(*i*) are views showing the end cap of FIGS. 1(*a*) and 1(*b*), wherein FIG. 2(*a*) is a look-through view as viewed from the back side, FIG. 2(*b*) is a look-through view as viewed from the upper side (the upper side in a state in which the end cap is attached to the vehicle body), FIG. 2(*c*) is a sectional view taken along line C-C in FIG. 2(*a*), FIG. 2(*d*) is a sectional view taken along line D-D in FIG. 2(*a*), FIG. 2(*e*) is a sectional view taken along line E-E in FIG. 2(*a*), FIG. 2(*f*) is a sectional view taken along line F-F in FIG. 2(*a*), FIG. 2(*g*) is a sectional view taken along line G-G in FIG. 2(*a*), FIG. 2(*h*) is a sectional view taken along line H-H in FIG. 2(*a*), and FIG. 2(*i*) is a look-through view showing a right side surface of the end cap shown in FIG. 2(*a*).

FIGS. 3(*a*) and 3(*b*) show an end portion of a molding main body to which the end cap shown in FIGS. 1(*a*) and 1(*b*) is attached, wherein FIG. 3(*a*) is a plan view of the molding main body (a view from the upper side in a state in which the molding main body is attached to the vehicle body), and FIG. 3(*b*) is a back view of the molding main body. FIGS. 3(*c*) to 3(*f*) show the state in which the end cap shown in FIGS. 1(*a*)

and 1(b) is attached to an end portion of the molding main body shown in FIGS. 3(a) and 3(b), wherein FIG. 3(c) is a sectional view taken along line C-C in FIG. 3(a), FIG. 3(d) is a view from a direction D in FIG. 3(b), FIG. 3(e) is a sectional view taken along line E-E in FIG. 3(b), and FIG. 3(f) is a sectional view taken along line F-F in FIG. 3(b).

MODE FOR CARRYING OUT THE INVENTION

In the below, an end cap 1 according to an embodiment of the present invention will be described with reference to the drawings. Also, a molding which is composed of a molding main body 5 and the end cap 1 attached thereto will be described with reference to the drawings.

Figure 4A:
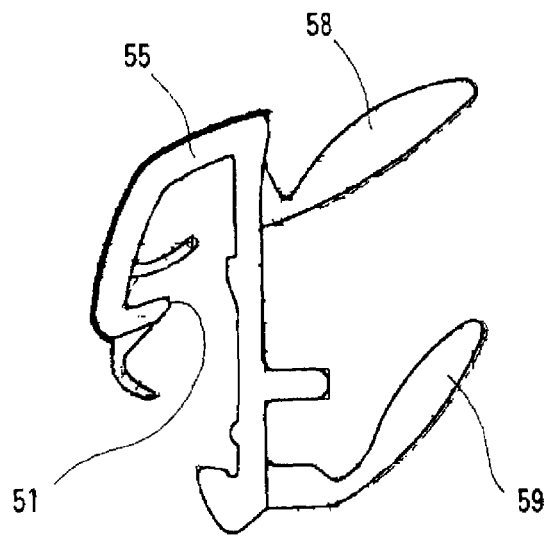
FIG. 4(a) is a view showing a general cross section of the molding main body shown in FIGS. 3(a) and 3(b)
Figure 4B:
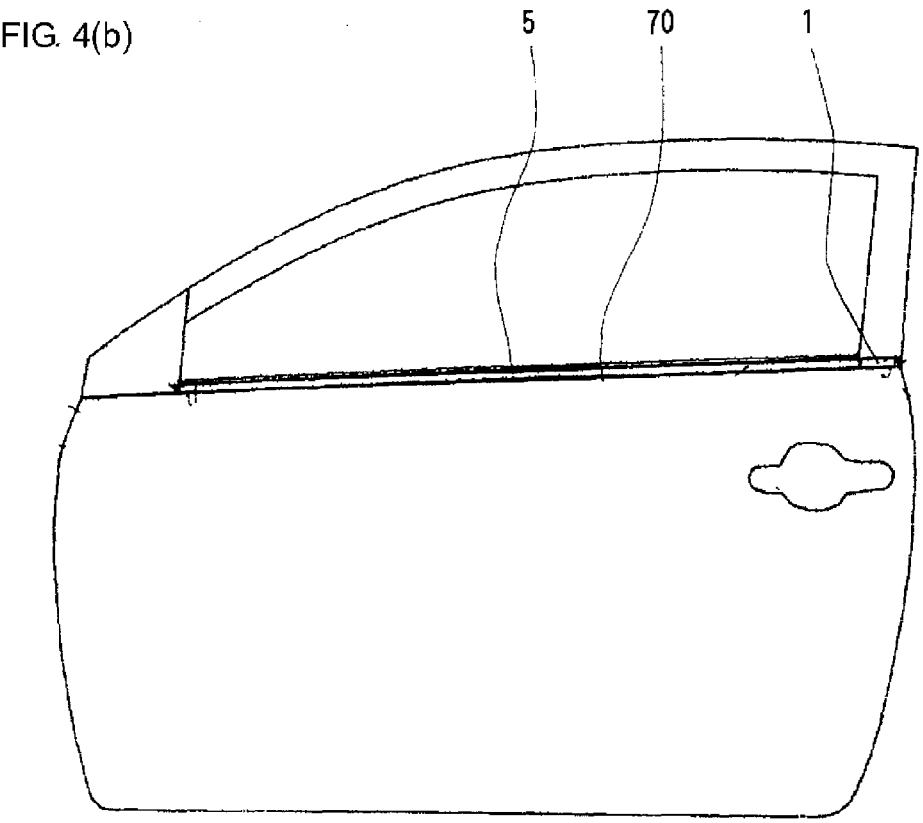
FIG. 4(b) is an explanatory view showing a portion of an automobile to which a molding is attached.

Notably, as exemplified in FIG. 4(b), the molding composed of the molding main body 5 and the end cap 1 attached thereto, is attached to an upper edge portion of an outer panel 70. FIG. 4(a) shows the general cross section of the molding main body 5 (a cross section of an ordinary portion excluding end portions, etc.). In FIG. 4(a), reference numeral 58 denotes an upper lip, and reference numeral 59 denotes a lower lip. Since the general cross section of the molding main body 5 is known, it will not be described further.

The end cap 1 is attached to an end portion of the molding main body 5, which has an opening in its cross section, so as to impart an aesthetic appearance to the molding main body 5. When the end cap 1 is attached to the molding main body 5, a clip 20 provided on the end cap 1 projects downward from an opening 51 of the molding main body 5. This clip 20 is locked to the vehicle body (outer panel) 70 through an operation of pressing the outer surface (upper surface) of a wall portion (top wall portion) 55, which is a portion of the molding main body 5 opposite the opening 51 (a portion located on the side opposite the opening), so as to press the clip 20 via the wall portion 55. Thus, the end cap 1 is attached to the vehicle body (the outer panel) 70 along with the molding main body 5.

Here, the terms "upper" and "lower" refer to the "upper" and "lower" directions, respectively, in a state in which the molding is attached to the vehicle body. Also, the "molding main body 5 has an opening in its cross section" means that the cross section of the molding main body 5 has the shape of an annulus which is partially cut so as to form an opening, as shown in FIGS. 2(d) to 2(f) and FIGS. 3(d) to 3(f). For example, it means that the shape of the cross section can be represented by a character such as C, U, J, V, or a squarish C.

The end cap 1 has a cap portion 30 and an insertion portion 40. The cap portion 30 is a portion which covers an end portion of the molding main body 5 so as to prevent the end portion from being exposed. The insertion portion 40 is a portion which is inserted into the molding main body 5.

When the insertion portion 40 is inserted into the molding main body 5 through its end portion such that a forward end portion 402 of the insertion portion 40 is first inserted into the molding main body 5, a locking portion 450 provided on the insertion portion 40 fits into a cutout 570 (FIG. 3(b)) provided in the molding main body 5 at a corresponding location, due to a resilient force of a vertical plate portion 45 of the insertion portion 40 which supports the locking portion 450 (FIG. 3(f)). As a result, the end cap 1 is fixedly mounted attached to the molding main body 5, whereby an integrated molding is obtained. Notably, reference numeral 401 denotes a proximal end portion of the insertion portion 40.

Fitting of the locking portion 450 into the cutout 570 is realized as follows. Since the locking portion 450 projects from the insertion sliding-contact surface 451 of the vertical plate portion 45 formed of a resilient resin, when the insertion portion 40 is inserted into the molding main body 5, the insertion sliding-contact surface 451 is slidably guided by a guide surface 571 of the molding main body 5, whereby the locking portion 450 is fitted into the cutout 570. Namely, the vertical plate portion 45 is pushed and deformed by the locking portion 450 projecting from the insertion sliding-contact surface 451, and the deformed vertical plate portion 45 pushes the locking portion 450 back, whereby the locking portion 450 is fitted into the cutout 570.

Between the clip 20 and the cap portion 30 (in the vicinity of the locking portion 450), as shown in FIG. 3(f), a horizontal plate portion 47 is provided near the lower end of the vertical plate portion 45 such that a gap is formed between the horizontal plate portion 47 and the vertical plate portion 45. Notably, this gap is present only between the clip 20 and the cap portion 30, because, on the cap portion 30 side, the vertical plate portion 45 and the horizontal plate portion 47 are connected through the cap portion 30, and, on the clip 20 side, the vertical plate portion 45 and the horizontal plate portion 47 are directly connected together at the position of the clip 20. Namely, in a region forward of the clip 20 (in a region near the forward end portion 402 of the insertion portion 40), the vertical plate portion 45 and the horizontal plate portion 47 are connected together with no gap formed therebetween.

A plate-shaped rib 470 extends downward from an edge (an edge which faces the gap) of the horizontal plate portion 47 such that its plate surface 4703 extends along the insertion direction. A lower end portion (a forward end portion) 4702 of the plate-shaped rib 470 is provided such that the lower end portion 4702 butts against the upper surface of the door panel 70 in the case where, as described above, the lower end side of the cap portion 30 is located outward of the right edge of the outer panel 70 due to, for example, dimensional errors of relevant components, when a pressing force is applied from the side of the wall portion (top wall portion) 55, which is located on the side opposite the opening, so as to lock the clip 20 to the outer panel 70. For example, the forward end portion 4702 of the plate-shaped rib 470 faces the upper surface of a corresponding portion of the outer panel 70 with a small clearance formed therebetween.

When the lower end portion (forward end portion) 4702 of the plate-shaped rib 470 butts against the upper surface of the outer panel 70 in the above-described manner, the plate-shaped rib 470 receives a reaction force from the outer panel 70 side, and pushes back the molding (the molding main body 5 and the end cap 1). Therefore, the molding does not cause deformation which would otherwise occur due to the pressing force for locking the clip 20. Accordingly, even when the above-mentioned dimensional errors of relevant members, etc. are present, a corresponding portion of the outer panel 70 does not fit into the space between the cap portion 30 and the clip 20 of the end cap 1, whereby deterioration of appearance is prevented.

As shown in FIG. 2(g), there are assumed an imaginary plane 45p including the vertical plate portion 45, which receives, at its one edge portion (upper edge portion) 452, a pressing force Fa which is applied to the top wall portion 55 (a wall portion located opposite the opening) so as to lock the clip 20, and an imaginary plane 470p containing the plate-shaped rib 470 which receives a reaction force Fb produced by the outer panel 70 against the pressing force Fa. In the present example, the imaginary plane 45p and the imaginary plane 470p are slightly sifted from each other. Therefore, a rotational force acts on the molding. Namely, a force acts on a portion of the molding near the upper edge thereof in a direction toward the vehicle body (arrow c), and a force acts on a portion of the molding near the lower edge thereof in a direction away from the vehicle body (arrow d). As a result, an upper portion which butts against a glass plate is pushed toward the glass plate side more strongly, and the pressing force for attaching the clip 20 is prevented from adversely affecting the sealing performance of the molding.

Also, in the present example, as shown in FIG. 2(*a*), the forward end portion 4704 of the plate-shaped rib 470 with respect to the insertion direction is located forward of the locking portion 450 with respect to the insertion direction. The amount of forward shift of the forward end portion 4704 from the locking portion 450 is indicated by "t" in FIG. 2(*a*). Therefore, before the locking portion 450 reaches the sliding-contact guide surface 571 of the molding main body 5, the forward end portion 4704 of the plate-shaped rib 470 with respect to the insertion direction is inserted into the molding main body 5. In other words, before the locking portion 450 is pushed by the sliding-contact guide surface 571 and the vertical plate portion 45, which supports the locking portion 450, starts to deform, insertion of the plate-shaped rib 470 into the molding main body 5 is started. Therefore, there does not occur a problem that the plate-shaped rib 470 engages with the end portion of the molding main body 5 and hinders the insertion of the end cap 1 into the molding main body 5.

DESCRIPTION OF REFERENCE NUMERALS

1: end cap
20: clip
30: cap portion
40: insertion portion
401: proximal end portion of the insertion portion
402: forward end portion of the insertion portion
45: vertical plate portion
45p: imaginary plane including the vertical plate portion
450: locking portion
451: insertion sliding-contact surface
452: one edge portion of the vertical plate portion
47: horizontal plate portion
470: rib
470p: imaginary plane including the rib
4701: proximal end portion of the rib
4702: forward end portion of the rib
4703: plate surface of the rib (along the insertion direction)
4704: forward end portion of the rib with respect to the insertion direction
5: molding main body
51: opening
55: wall portion (top wall portion) (on the side opposite the opening)
570: cutout
571: (sliding-contact) guide surface
58: upper lip
59: lower lip
70: outer panel

The invention claimed is:

1. An end cap which is attached to an end portion of a molding main body having an opening in its cross section and which is attached to a vehicle body together with the molding main body through an operation of pressing a clip, which projects from the opening of the molding main body, via the molding main body to thereby lock the clip to the vehicle body, the end cap comprising:

a cap portion which covers the end portion of the molding main body when the end cap is attached to the molding main body;

an insertion portion whose proximal end portion is continuous with an inner surface of the cap portion and which is inserted into the molding main body such that a forward end portion of the insertion portion is first inserted into the molding main body; and a rib which is provided on the insertion portion such that the rib projects from the opening of the molding main body and which receives a reaction force from the vehicle body when a forward end portion of the rib butts against the vehicle body due to a pressing force which is applied to the clip via the molding main body so as to lock the clip, wherein the insertion portion includes a vertical plate portion having an insertion sliding-contact surface which comes into sliding contact with a guide surface of the molding main body when the insertion portion is inserted into the molding main body, and a horizontal plate portion with which a proximal end portion of the rib is continuous, wherein the vertical plate portion is provided such that its one edge portion butts against an inner surface of a wall portion of the molding main body located on the side opposite the opening so as to receive the pressing force which is applied to the clip via the molding main body so as to lock the clip, and the rib is located on the outboard side of an imaginary plane containing the vertical plate portion.

2. An end cap according to claim 1, wherein the insertion portion includes a locking portion which projects from the insertion sliding-contact surface, which comes into sliding contact with the guide surface of the molding main body when the insertion portion is inserted into the molding main body, the locking portion being fitted into and locked to a cutout provided on the guide surface by a resilient force of the insertion portion, wherein the rib comprises a plate-shaped rib having a plate surface extending in the insertion direction, and a forward end portion of the plate-shaped rib with respect to the insertion direction is located forward of the locking portion with respect to the insertion direction.

3. A molding including an end cap according to claim 1 and a molding main body to which the end cap is attached.

* * * * *